Sept. 18, 1934.  A. KREMMLING  1,974,336
DEPOSITING MACHINE
Filed Jan. 31, 1933   2 Sheets-Sheet 2
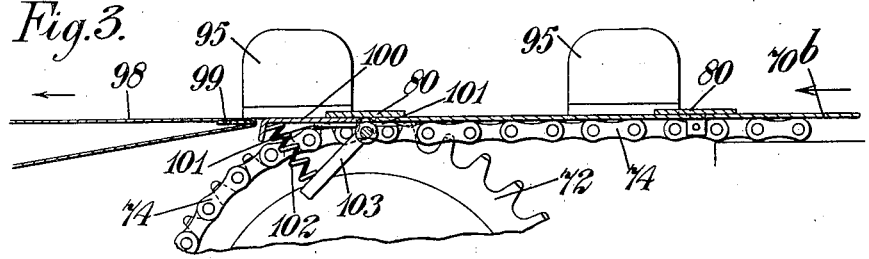
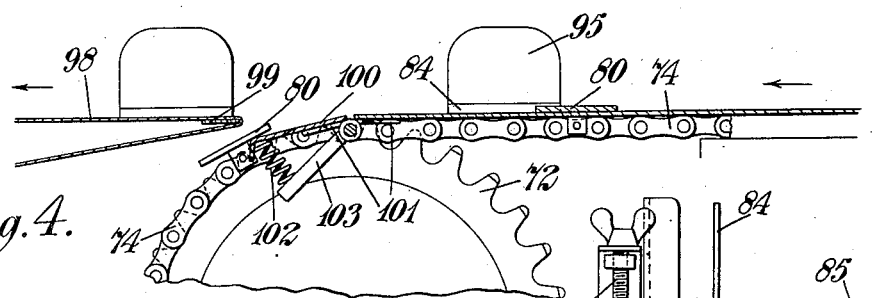
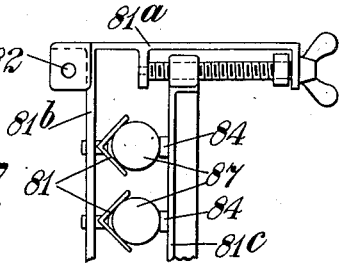
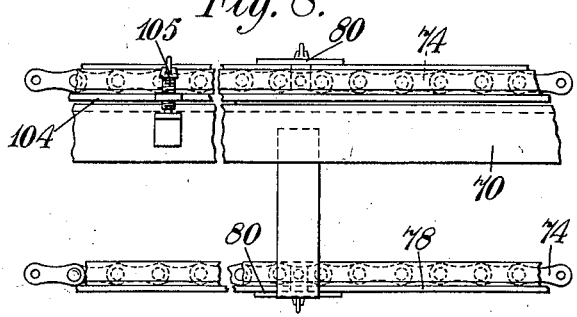
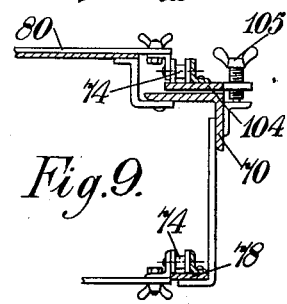

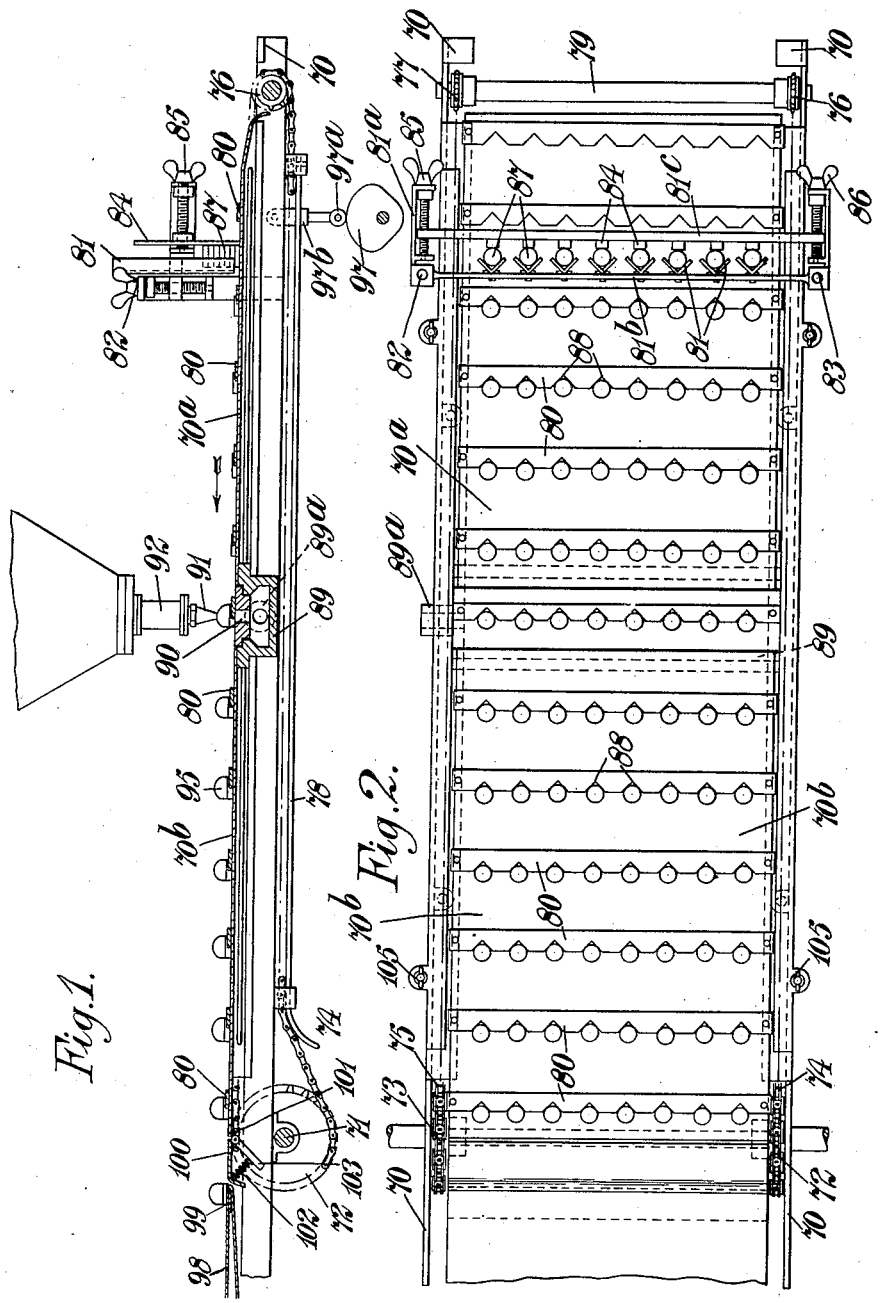

Patented Sept. 18, 1934

1,974,336

UNITED STATES PATENT OFFICE 1,974,336

DEPOSITING MACHINE

Aribert Kremmling, Hammersleben, near Oschersleben, Germany

Application January 31, 1933, Serial No. 654,536
In Germany February 12, 1932

9 Claims. (Cl. 107—1)

This invention relates to machines for applying coating or decorating materials to articles and is particularly applicable in the application of coating or decorating material such as meringue, marshmallow, chocolate, buttercream or the like (hereinafter referred to as "cream") to pastry, cakes, biscuits or other articles (hereinafter referred to as "biscuits").

The invention more particularly relates to machines of the type wherein the cream is applied to the biscuits by a depositing machine having nozzles which may be displaced in a horizontal plane for shaping the coating or deposit and an object of the invention is to provide improved means whereby the biscuits are held against lateral displacement during the application of the cream and further, in the case where the severing of the deposit from the nozzle is effected by vertical displacement of the biscuit support relatively to the nozzles, to ensure that the biscuits move away together with the support from the nozzles at the end of the depositing period.

The invention consists in a machine for applying cream or like coatings to biscuits or the like comprising a depositing apparatus having a nozzle (or nozzles) adapted for movement in a horizontal plane, a support for the biscuits located below the depositor and having apertures adapted to be aligned with the nozzles, vacuum means operating through the apertures for holding the biscuits on the support during the depositing period and while the support is moving downwardly away from the nozzles, and means for severing the deposits from the nozzles.

Severance of the deposits from the nozzles may be effected by a vertical displacement of the support relatively to the nozzles, the vacuum holding means being effective during such displacement.

The biscuits may be fed by an endless conveyor means along a table which extends on either side of an apertured support, the biscuits being extracted by the conveyor from a supply located above the table.

After receiving the deposits, the conveyor means are adapted to remove the biscuits and advance them along the table and transfer them to a delivery conveyor.

The endless conveyor means may comprise a series of spaced transfer bars connected to endless conveyor chains.

In the accompanying drawings:—

Figures 1 and 2 show in longitudinal sectional elevation and plan an embodiment of the machine in which the biscuits are automatically fed from a hopper to the depositing position and thence to a delivery conveyor.

Figures 3 and 4 are partial views on a larger scale showing the end of the table where the treated biscuits are delivered to the delivery conveyor.

Figure 5 is a detail of a modification in which the severance of the biscuits from the nozzles is effected by a wire cutter device.

Figures 6 and 7 are detail elevation and plan of the biscuit hopper or supply.

Figures 8 and 9 are side elevation and cross-section of the means for adjusting the height of the biscuit conveying device for dealing with biscuits of different thickness.

In carrying the invention into effect according to one convenient mode whereby biscuits or the like may be automatically fed from a plurality of stacks, a series of spaced transfer bars is provided mounted upon endless chains, whereby they may be drawn beneath the stacks of biscuits to remove the lowest biscuits therefrom which are then conveyed across the table to the suction holding device for a deposit and thence to a delivery conveyor.

Thus, referring to Figures 1 and 2, the table, comprising side angle members 70 which support a pair of plates 70a and 70b located on either side of the suction holding device, is mounted to oscillate about a shaft 71 by means of rotary cams 97 engaging rollers 97a carried by arms 97b connected to the side angles 70. The shaft 71 carries a pair of sprocket wheels 72 and 73 engaged by side chains 74 and 75 which are carried around guide sprockets 76 and 77 mounted upon a shaft 79 at the other end of the table. The tension of the chains may be adjusted by a movement of the shaft 79. The lower or return laps of the chains run over guide rails 78. Extending between the chains and detachably connected thereto in any suitable manner is a series of spaced transfer or conveying bars 80 which are adapted to rest upon the table (plates 70a and 70b).

At the right hand end of the table as seen in Figure 1 a biscuit hopper device is provided which is mounted upon the side angles 70 of the table so as to partake of the vertical movements thereof. This hopper device is adjustable as to height relatively to the table by the screws 82 and 83 and comprises side brackets 81a which carry transverse bars 81b and 81c, the latter being adjustable by means of the screws 85 and 86 with respect to the brackets 81a. The transverse bar 81c carries a series of vertical slats 84 which are disposed opposite vertical channel members 81 mounted upon the transverse bar 81b. Each slat 84 together with its corresponding channel member forms a vertical hopper for a stack of biscuits, the lowest of which rests upon the table 70a. By adjusting the transverse bars 81c by means of the screws 85 and 86 the lateral dimensions of the hopper may be suitably arranged according to the size of the biscuits being treated.

The hopper as a unit may be adjusted vertically with respect to the table by operating the screws 82 and 83.

The transverse conveying bars 80 slide beneath the hoppers and engage the lowest biscuits which are drawn out of the hoppers and carried along the table top. In order to adjust and maintain the correct lateral position of the biscuits on the table the transverse bars 80 are provided with a series of notches 88 corresponding to the number of biscuits in each row.

The shaft 71 is intermittently operated by any suitable means, such as a ratchet device so that the biscuit transferring or conveying device is given a step-wise motion to transfer the biscuits from the hoppers to the coating position beneath tht nozzles 91 where the biscuits rest upon a plate or support 90a (Fig. 5) provided with apertures 90 connected to a suction box 89 which is rigidly mounted upon the side members 70 of the table. The suction box is provided with a suitable union 89a for connection to a fan or other source of suction.

The nozzles 91 are connected to the hopper by means of flexible connections 92, whereby the nozzles may be moved laterally in a horizontal plane by suitable cam means for the purpose of providing any desired design of deposit upon the biscuits.

During the depositing of the cream or the like upon the biscuits the latter are held in position on the apertured plate by the suction action and while the cream is being deposited the table is in the raised position shown in Figure 1 by the cams 97. At the termination of the depositing operation the cams 97 are rotated to lower the table and break the deposits from the nozzles. The shaft 71 is thereupon given a further feeding action to advance the treated biscuits beyond the suction holding device while bringing a further row into position for treatment. At the same time another row of biscuits is removed from the hoppers.

The treated biscuits are transferred from the table onto a delivery conveyor 98 which moves around a plate or blade 99 adjacent the end of the table.

In order to permit return of the transfer bars, which move downwardly at the delivery end of the table, the table at this position is provided with a downwardly hinging section 100 which is pivoted to the table by a hinge plate 101. The hinging section 100 is spring held in its normal horizontal position by springs 102 abutting against the plate and against a fixed bar 103 mounted upon the table.

As the transfer bars advance beyond the end of the table the treated biscuits are moved onto the delivery conveyor and the bars move downwardly pressing the hinging section downwards against the action of the springs and after the bars have passed beyond the hinging section the latter again rises into its normal position ready for the transfer of the next row of treated biscuits onto the delivery conveyor.

Instead of the springs 102, the hinging flap 100 may be counterweighted so that it returns to the normal position after the passage of each transfer bar.

When treating biscuits of normal thickness the transfer bars ride directly upon the top of the table. In order to deal with biscuits of different thickness means are provided for adjusting the transfer bars 80 relatively to the table top. For this purpose side plates 104 are provided which form tracks for the conveyor chains 74; these tracks may be adjusted vertically with reference to the side angles 70 by means of the screws 105, see Figures 8 and 9. The conveyor chains 74 are adapted to rest upon these plates 104 and by a suitable adjustment of the plates the transfer bars 80 will be raised from the top of the table when it is desired to deal with thick biscuits. By these means not only normal thin biscuits but relatively thick biscuits and also hollow articles, such as tart cases, may be engaged by the transfer bars and transported from a hopper to the cream treating position.

Instead of raising and lowering the table to break the deposit from the nozzles the table may be rigidly mounted and the severance of the deposit from the nozzle may be effected by a wire-cutter device 94, as indicated for example in Figure 5. The nozzle 93 is suitably formed with an inclined surface to engage and guide the wire 96a (Fig. 5). This form of apparatus is suitable for cases in which the top of the deposit is flat and not pointed as would occur in the case where the severance is effected by relative downward movement of the table.

The transfer bars are connected to the conveyor chains in any suitable manner so that they may be readily detached when it is desired to replace them by other bars having differently spaced recesses 88, in order to treat a different shape or size of biscuit.

It will be appreciated that the biscuits are under full control by the transfer bars 80 from the time they leave the hopper or supply until they are transferred to the delivery conveyor 98 and during the whole period they are maintained separate from one another so that sticking of the biscuits together and damage caused thereby is entirely avoided. Moreover, when the biscuits arrive at the depositing position they are accurately positioned longitudinally of the feed and laterally by the recesses in the transfer bars so that the cream will be accurately deposited on the biscuits in the desired position.

Having now described my invention what I claim as new and desire to secure by Letters Patent is:—

1. A machine for applying cream or like coatings to biscuits or the like, comprising a depositor having nozzles through which the cream is extruded, a table located below the nozzles and having apertures aligned with the nozzles, and adapted to be covered by the biscuits, a transfer device for feeding a row of biscuits along the table and over the apertures, said device comprising a bar arranged transversely of the table and having recesses to accommodate the biscuits, and means for vertically adjusting the travel of the transfer device to vary the elevation of the bar relative to the table to accommodate biscuits of different thickness, and suction means mounted on the table and operating through the apertures to hold the biscuits in position on the table during treatment.

2. A machine for applying cream or like coatings to biscuits or the like, comprising a depositor having nozzles through which the cream is extruded, a table located below the nozzles and having apertures aligned with the nozzles and adapted to be covered by the biscuits, suction means operating through the apertures to hold the biscuits in position on the table during treatment, a biscuit supply hopper located above the table, transfer means for withdrawing biscuits from the hopper and advancing them along the table to cover the apertures, and transferring coated biscuits to a relivery conveyor, said means comprising a series of spaced bars extending transversely of the table and connected to endless travelling chains.

3. A machine for applying cream or like coatings to biscuits or the like, comprising a depositor having nozzles through which the cream is extruded, a table located below the depositor and having apertures aligned with the nozzles, suction means operating through the apertures from below the table, a biscuit conveyor having a feeding run travelling along the table and a return run below the table, said conveyor feeding biscuits to the suction apertures for a deposit and then transferring the coated biscuits from the table to a delivery conveyor, said table having a downwardly hinging section at the delivery end to permit the biscuit conveyor to pass downward between the table and delivery conveyor.

4. A machine for applying cream or like coatings to biscuits or the like, as claimed in claim 3, wherein the biscuit conveyor comprises a series of spaced transverse bars connected to endless travelling chains, guided on vertically adjustable tracks, said bars having recesses in their forward edges to engage and position the biscuits laterally of the direction of feed, and means for vertically adjusting the tracks to vary the vertical position of the conveyor relative to the table to accommodate biscuits of different thickness.

5. A machine for applying cream or like coatings to biscuits or the like as claimed in claim 3, wherein said hinging section is pivotally mounted on the table and is provided with springs for returning it to normal position after the passage of the biscuit conveying device.

6. A machine for applying cream or like coatings to biscuits or the like as claimed in claim 3, wherein a biscuit supply hopper is mounted above the table and the biscuit conveyor comprises a series of spaced transverse bars connected to endless driving chains, said bars passing below the hopper to extract biscuits therefrom and deliver them in spaced relation along the table to the depositing position over the suction apertures.

7. A machine for applying cream or like coatings to biscuits or the like as claimed in claim 3, wherein the biscuit conveyor comprises a series of spaced transverse bars connected to endless driving chains, said bars moving along the top of the table and engaging biscuits supported thereon, and means for adjusting the distance of the bars from the table, whereby biscuits of different thickness may be fed along the table by the bars.

8. A machine for applying cream or like coatings to biscuits or the like, comprising a depositor having a plurality of nozzles through which the cream is extruded, a table located below the depositor and having a transverse row of suction apertures aligned with the nozzles and adapted to be covered by the biscuits, means for creating a suction effect at said apertures to hold biscuits in position during the application of the cream, a plurality of biscuit supply hoppers arranged transversely of the table, a biscuit conveying device comprising a series of spaced bars connected to endless travelling chains, each bar adapted to extract the lowest biscuits from the hoppers and feed them over the suction apertures, means for driving the conveyor stepwise to cause a plurality of spaced rows of biscuits simultaneously to travel along the table, and means for intermittently causing vertical displacement of the table relatively to the nozzles to sever the deposits from the nozzles.

9. A conveyor for feeding biscuits in spaced relation along a supply surface comprising a plurality of spaced bars connected to endless travelling chains, each bar having a series of recesses adapted to engage the biscuits and position and maintain them laterally of the direction of travel, and means for adjusting the distance of the bars from the supporting surface, whereby biscuits of different thickness may be fed along the supporting surface.

ARIBERT KREMMLING.